(12) United States Patent
Quehenberger et al.

(10) Patent No.: US 7,296,669 B2
(45) Date of Patent: Nov. 20, 2007

(54) SIMPLE ACTION ACTUATOR WITH A HYDRAULIC FAST-OPENING VALVE FOR CONTROLLING A CLUTCH

(75) Inventors: Johannes Quehenberger, Saalbach (AT); Franz Gratzer, Stallhofen (AT); Dieter Schmidl, Graz (AT)

(73) Assignee: Magna Drivetrain AG & Co KG, Lannach (AT)

( * ) Notice: Subject to any disclaimer, the term of this patent is extended or adjusted under 35 U.S.C. 154(b) by 207 days.

(21) Appl. No.: 10/533,343

(22) PCT Filed: Oct. 31, 2003

(86) PCT No.: PCT/AT03/00327

§ 371 (c)(1),
(2), (4) Date: Apr. 29, 2005

(87) PCT Pub. No.: WO2004/040158

PCT Pub. Date: May 13, 2004

(65) Prior Publication Data

US 2006/0162328 A1    Jul. 27, 2006

(30) Foreign Application Priority Data

Oct. 31, 2002   (AT) ............................... 735/2002 U

(51) Int. Cl.
*F16D 31/02*   (2006.01)
*F16D 25/12*   (2006.01)

(52) U.S. Cl. ........................ 192/85 R; 60/478; 91/433; 91/442

(58) Field of Classification Search .................. 60/460; 91/268, 442
See application file for complete search history.

(56) References Cited

U.S. PATENT DOCUMENTS

| 2,916,879 | A | * | 12/1959 | Gondek | ........................ | 60/460 |
| 3,060,688 | A | * | 10/1962 | Gondek | ........................ | 91/433 |
| 4,505,364 | A | * | 3/1985 | Goucher et al. | ........... | 192/3.58 |
| 4,637,503 | A | * | 1/1987 | Vohl | ........................ | 192/85 C |

FOREIGN PATENT DOCUMENTS

| EP | 0 348 270 | 12/1989 |
| EP | 1 256 478 | 11/2002 |

* cited by examiner

*Primary Examiner*—Rodney H. Bonck
(74) *Attorney, Agent, or Firm*—Harness, Dickey & Pierce, P.L.C.

(57) ABSTRACT

An actuator with a simple function for the control of a friction clutch in the drive train of a motor vehicle having a cylinder/piston unit for generating the contact pressure of the clutch should be fast, inherently safe and nevertheless simple and inexpensive. For this purpose, a controllable pump (3) generates a pressure medium and makes it available to the cylinder/piston unit (1) via a self-regulating valve unit (2). A dump valve (8) consists of a sleeve (10) and a spring-assisted slide (12) therein. The sleeve has a first opening (11), through which the pressure medium can flow from the cylinder/piston unit (1). The slide (12) exposes the opening (11) in a first position and conceals the opening of a second position. The clutch is controlled in this way by actuating the electric motor.

8 Claims, 2 Drawing Sheets

SIMPLE ACTION ACTUATOR WITH A HYDRAULIC FAST-OPENING VALVE FOR CONTROLLING A CLUTCH

BACKGROUND OF THE INVENTION

The invention relates to an actuator with a simple function for the control of a friction clutch in the drive train of a motor vehicle having a cylinder/piston unit for generating the contact pressure of the clutch, in conjunction with which a controllable electric motor/pump unit provides a pressure medium and is connected to the cylinder/piston unit via a self-regulating valve unit, so that the clutch is controlled by actuating the pump. The invention can thus relate both to clutches for locking a differential and to clutches for controlling the torque directed to an axle or to a wheel. The actuator acts in the closing direction of the clutch, and an internal force inside the clutch, such as a spring, acts in the opening direction.

The requirements in respect of the controllability of friction clutches are very high for applications in a motor vehicle, both with regard to the accuracy of adjustment of a specific torque and with regard to the speed of the control. The latter is particularly applicable to the releasing of the clutch, for example in the case of operation in conjunction with ABS or ESB. The need for inherent safety is also relevant in addition. This means that the safest condition (most often, this will be the clutch in its released state) must be adopted in the event of a system failure.

According to the general state of the art, the contact pressure necessary for clutches of the kind in question is applied either mechanically or hydraulically. Ramp rings, for example, find an application in the former case, for the rotation of which a source of electrical power is used. Mechanisms of this kind are disadvantageous, if only because of the large number of components with their associated friction and free play.

In the case of hydraulic actuation by means of an external pump, the speed of response required for interaction with an electronic system can only be achieved with a heavily dimensioned combined electric motor and pump unit, which is out of the question for reasons of weight and, above all, power consumption. A pressure accumulator and an actuated control valve are also required. If a pump that is dependent on the difference in the speed of rotation and rotates together with the clutch components is used instead of these, the drive must be transmitted to a rotating part, which is costly and disadvantageous. A further problem is that, for a low difference in speed, the pressure necessary for control is not available.

In the case of rather slower operation, and with a specific torque value to be transmitted, moreover, the pressure of the pressure medium acting on the clutch must be maintained, which means high circulation losses for a non-controllable electric motor/pump unit. In all previously disclosed systems, both the release speed and the inherent safety leave something to be desired.

An actuator of the kind in question is previously disclosed in EP 348 270, in which control is achieved by means of a non-reversible motor/pump unit. The self-regulating valve unit contains, in addition to a dump valve, a differential slide, which keeps the dump valve closed only in the presence of an adequate flow rate for the fluid supplied by the pump. As a result, the energy consumption is considerable if the pressure in the cylinder/piston unit must be maintained.

Also proposed in EP 1 256 478, which has not previously been published, are a reversible, controllable pump and a dump valve, which valve responds to the difference between the pressure generated by the pump and the pressure prevailing in the cylinder/piston unit. In order to permit rapid opening of the clutch, a throttled secondary circuit is required, although this makes it impossible to maintain the pressure in the cylinder/piston unit in the presence of a low supply or in the absence of any supply.

The object of the invention is to provided an actuator which does not exhibit the aforementioned disadvantages, and which is accordingly fast, inherently safe, simple and inexpensive. The actuator permits the clutch to be maintained in the engaged position with a minimum supply from the pump.

SUMMARY OF THE INVENTION

The object is achieved in accordance with the invention, in that the self-regulating valve unit contains: a dump valve, which responds to the pressure prevailing on the side of the pump facing towards it, and a nonreturn valve between the two units, which permits a flow to take place only in the direction from the electric motor/pump unit to the cylinder/piston unit, and in that the electric motor/pump unit is reversible, as a consequence of which its supply flows in the opposite direction when in the reversed state, as a result of which opening of the dump valve is accelerated. The clutch is accordingly actuated via the control for the electric motor, which can be very rapid and accurate. The hydraulic transmission takes place via the self-regulating valve unit, which ensures that the clutch is capable of being opened rapidly without any external actuation and causes it to return to its safe (disengaged) position in the event of failure of the electrical system. This is because the valve opens if the pump pressure is completely absent. The self-regulating valve unit exhibits the dump valve for this purpose, which is acted upon only by the pressure prevailing on the side of the pump facing towards it, and not by any differential pressure.

In one practical embodiment, the dump valve consists of a sleeve and a spring-assisted slide therein, which sleeve has at least one first opening, through which pressure medium from the cylinder/piston unit can flow, and which slide is capable of being displaced between a first position, in which it exposes the opening, and a second position, in which it conceals the opening. In one embodiment, the spring force predominates in the first position, and the force exerted by the pressure medium on the slide predominates in the second position.

In an advantageous embodiment, the slide of the dump valve is executed as a piston, which forms a first and a second chamber in the sleeve, of which the first chamber is capable of communicating with the cylinder/piston unit via the opening and possesses an outlet, and of which the second chamber communicates with the electric motor/pump unit. The supply of pressure medium to the cylinder/piston unit thus takes place by circumventing the dump valve via the nonreturn valve, the spring of which is appropriately dimensioned. A static pressure acts on the piston. The pressure can be maintained for a certain time in this way without the need for a follow-on supply from the pump, providing that adequate sealing is present in the cylinder/piston unit.

In a further development of the invention, the nonreturn valve is contained in the slide, for which purpose the slide exhibits at least one second opening, which is in alignment with at least the one first opening with the slide in one position, in which position the slide obstructs the communication between the first opening and the outlet. The space requirement is minimized in this way, and it is certain from the outset that the supply of pressure medium to the cylinder/piston unit will not commence until the openings for the outflow are already closed.

The electric motor/pump unit is reversible, as a result of which the outflow is accelerated. This offers two possibilities: either the spring assists the movement of the slide into the outflow position, or the spring is overcome by the supply in the opposite direction. In both cases, the outflow (=opening of the clutch) takes place very rapidly by reversing the pump.

A controller is preferably provided for the control of the electric motor/pump unit, which receives a set point value corresponding to the pressure in the piston/cylinder unit and an actual value corresponding to this pressure as input signals. The torque or a moving dynamic quantity of the vehicle can also be a corresponding value.

In order to meet all the safety requirements in return for the lowest possible power consumption, the spring of the dump valve and the spring of the nonreturn valve are dimensioned in such a way that, as the pressure of the pressure medium rises, the outlet opening is closed first, and the nonreturn valve is opened only once that has taken place. This also means that, in the event of a fall in pressure, the nonreturn valve closes first, and then the dump valve opens.

BRIEF DESCRIPTION OF THE DRAWINGS

The invention is described and explained in greater detail below with specific reference to the drawings. The Figures show the following.

DETAILED DESCRIPTION

Figure 1:
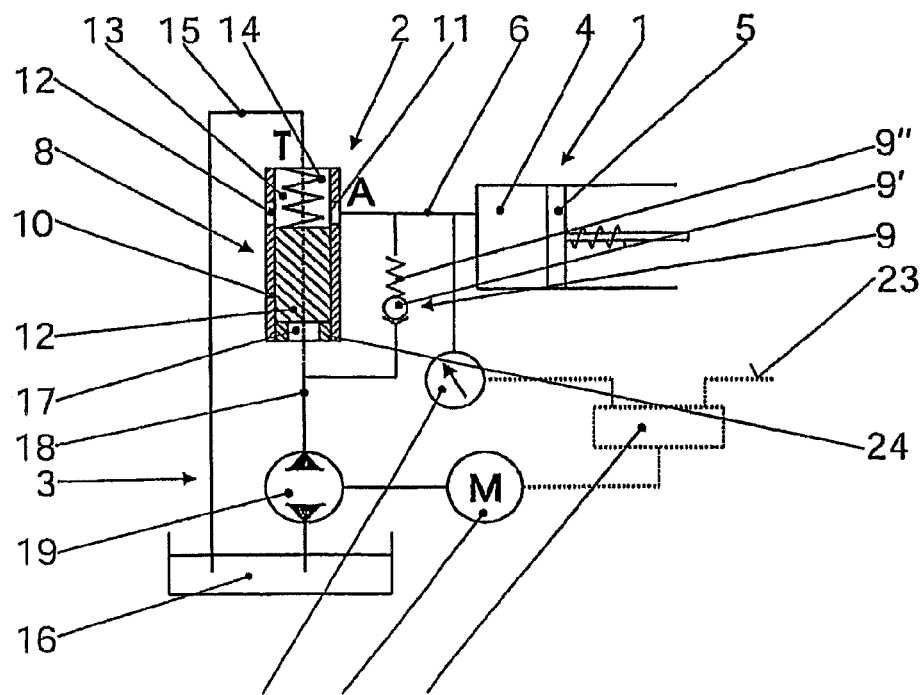
FIG. 1 is a schematic representation of a first embodiment.

In FIG. 1, by way of summary, a cylinder/piston unit is identified with the designation 1, a valve unit with 2, and an electric motor/pump unit with 3. Provided inside the cylinder/piston unit 1 is a pressure chamber 4, which communicates via a line 6 to the valve unit 2, in conjunction with which the pressure fluid contained in the pressure chamber 4 acts upon a piston 5. This piston 5 is a part of a friction clutch (not shown here) or is permanently and directly in communication with it. The force exerted by the piston 5 against the force of a spring (not shown here) acts upon the clutch plates in the friction clutch. As the pressure increases, the torque transmitted or exerted by the clutch also increases.

The valve unit 2 contains a dump valve 8 and a nonreturn valve 9. The latter has a ball 9' that is pressed against a seat by a spring 9". The dump valve 8 is formed by a sleeve 10 with at least one opening 11, which opening communicates with the pressure chamber 4 via the line 6, and by a piston 12 capable of being displaced in the sleeve 10. The piston 12 separates a first chamber 13 containing a pressure spring 14 from a second chamber 17. The first chamber 13 communicates via an outflow line 15 with a sump 16, from which the electric motor/pump unit 3 sucks up fluid and into which it delivers fluid. Connected to the second chamber 17 is a pressure line 18, which for its part provides the communication between the electric motor/pump unit 3 and—via the nonreturn valve 9—the pressure chamber 4.

The electric motor/pump unit 3 consists of a pump for the pressure fluid and a motor 20, which is actuated by a controller 21. The latter, for its part, receives an actual value determined by a pressure sensor 22 as an input signal and a set point value via a line 23, which values correspond in each case to the contact pressure or to the torque transmitted or to be transmitted by the clutch.

The function of the arrangement described here is as follows: in the position represented in FIG. 1, the electric motor/pump unit 3 delivers either not at all, or at a pressure that is insufficient to cause the nonreturn valve 9 to open or the dump valve 8 to close. No pressure is present in the pressure chamber valve 4, and the clutch (not shown here) is accordingly not subject to loading and as such does not transmit any torque. If an increase now takes place in the pressure of the pressure medium supplied by the pump 19 in the line 18, this acts in the second chamber 17 on the under side of the slide 12 executed as a piston against the force of the spring 14. If this pressure exceeds a specific value, the slide 12 closes the opening 11 and thus the outlet from the pressure chamber 4. The nonreturn valve 9 does not open until the opening 11 is fully closed, and pressure fluid is then able to flow into the pressure chamber and to actuate the clutch accordingly.

If the pump 19 is now suddenly brought to a halt, the pressure acting on the slide 12 decreases, and the latter is forced out of the way by the spring 14, whereby the openings 11 once again become free and the pressure fluid is able to escape from the pressure chamber 4 into the sump 16. If the electric motor/pump unit 3 is reversed so that the direction of supply is also reversed, so that the pump 19 feeds from the pressure line 18 into the sump 16, a partial vacuum will be produced under the slide 12 which will cause it to accelerate significantly as it moves out of the way. The clutch will then be opened fully and instantaneously as the motor 20 is reversed, for example as is required in the case of an ABS braking sequence.

If the pressure chamber is under pressure, and if the electric motor/pump unit 3 is at a standstill, the pressure will be retained for a time if the sealing is effective. This means that, in the case of stationary operation with the clutch engaged, the electric motor/pump unit 3 only needs to maintain sufficient pressure for the slide to remain closed. In this way, the delivery quantity is almost zero, since any leakage takes place for the most part in the interior of the pump. A considerable saving in energy is achieved by this means.

Figure 2:
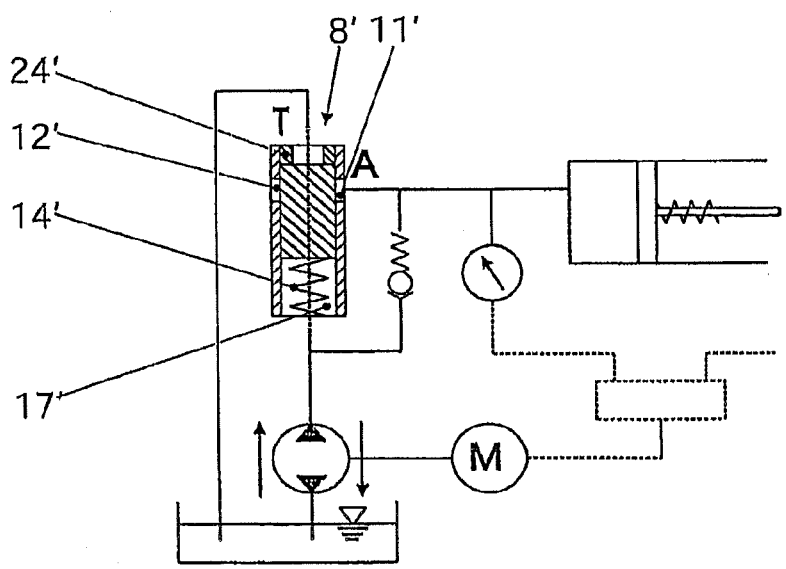
FIG. 2 is a variant of a first embodiment.

The variant illustrated in FIG. 2 differs from the previous embodiment only in the sense that the spring 14 does not act against the pressure exerted by the pump, but the spring 14' acts in the same direction as the pressure exerted by the pump. Otherwise the valve unit is the same. The pump must be reversed here in order for the outflow to take place.

Figure 3:
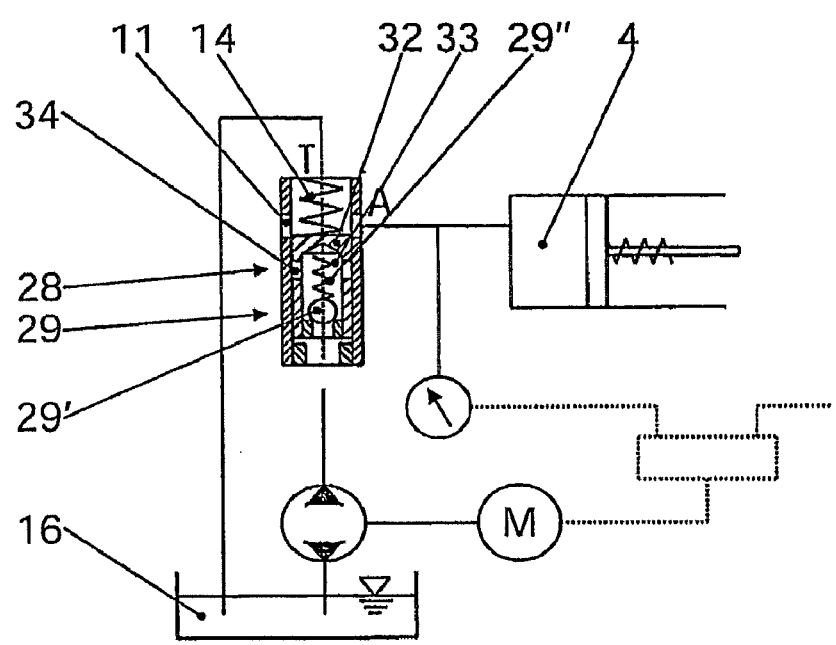
FIG. 3 is a schematic representation of a second embodiment.

The embodiment in FIG. 3 differs from that illustrated in FIG. 1 only in the sense that the nonreturn valve is repositioned in the interior of the pump. The sleeve 10 with the opening 11 remains unchanged, and present inside it are the piston and the slide 32, in the interior chamber 33 of which the nonreturn valve 29 is incorporated. It consists of a ball 29' and a spring 29". In addition the slide 32 has a second opening 34, which comes into alignment with the first openings 11 from a certain pressure of the pressure medium and a certain position of the slide 32. As the pressure of the pressure medium increases, the slide 32 is first caused to move upwards until the first opening 11 is obstructed and the pressure chamber 4 is closed; a further increase causes the nonreturn valve 29 to open, and fluid finds its way through the openings 11,34 in the pressure chamber 4 that have come into alignment in the meantime. This arrangement provides for the pressure chamber to be closed first, without particular matching of the springs, and only then to be filled with pressure medium.

All in all, in the manner described here, a means of controlling clutches in the drive train of a motor vehicle is permitted, which combines together very short response times, the accurate adjustment of a blocking moment or a coupling moment to be transmitted, a low energy requirement to maintain the set moment and inherent safety (in the event of failure of the system, no torque is transmitted), and all of this by means of a very simple and inexpensive arrangement.

The invention claimed is:

1. An actuator for the control of a friction clutch in the drive train of a motor vehicle, the actuator comprising:
   a cylinder/piston unit generating a contact pressure for the friction clutch;
   a reversible electric motor/pump unit (3) selectively providing a pressure medium; and
   a self-regulating valve unit (2) fluidly coupling the cylinder/piston unit and the reversible electric motor/pump unit such that the friction clutch is controlled by actuating the motor/pump unit (3), the self-regulating valve unit (2) having
      a dump valve (8;8';28;38) having a sleeve (10;10') and a slide (12;12';32) disposed within the sleeve, the dump valve further having a first opening (11,11') through which pressure medium from the cylinder/piston unit (1) can flow to a sump, the slide (12;12'; 32) being movable between a first position exposing the first opening (11;11') and a second position concealing the first opening (11;11'), the slide being spring biased in to the first position to permit the flow of pressure medium from the cylinder/piston unit to the sump when the reversible electric motor/pump unit is deactivated, the slide being positionable in the second position in response to positive pressure of the pressure medium from the reversible electric motor/pump unit and positionable in the first position in response to negative pressure of the pressure medium from the reversible electric motor/pump unit; and
      a nonreturn valve (9;29) fluidly coupling the cylinder/piston unit and the reversible electric motor/pump unit, the nonreturn valve being movable between a closed position and an opened position, the nonreturn valve being biased in the closed position, the nonreturn valve permitting flow of pressure medium therethrough only from the reversible electric motor/pump unit (3) to the cylinder/piston unit (1) in the opened position.

2. The actuator as claimed in claim 1, wherein the slide a piston (12;12';32), sized to form a first (13;13') chamber and a second (17;17') chamber within the dump valve, the first chamber being in fluid communication with the cylinder/piston unit via the first opening (11;11'), the second chamber being in fluid communication with the electric motor/pump unit (3) via an outlet (15) and the sump.

3. The actuator as claimed in claim 1, further comprising:
   a controller (21) controlling the electric motor/pump unit (3), the controller receiving a set point value signal corresponding to a desired pressure within the cylinder/piston unit and an actual value signal corresponding to an actual pressure within the cylinder/piston unit.

4. The actuator as claimed in claim 1, wherein the dump valve is biased such that the dump valve moves from the first position to the second position before the nonreturn valve moves from the closed position to the opened position.

5. An actuator for the control of a friction clutch in the drive train of a motor vehicle, the actuator comprising:
   a cylinder/piston unit generating a contact pressure for the friction clutch;
   a reversible electric motor/pump unit (3) selectively providing a pressure medium; and
   a self-regulating valve unit (2) fluidly coupling the cylinder/piston unit and the reversible electric motor/pump unit such that the friction clutch is controlled by actuating the motor/pump unit (3), the self-regulating valve unit (2) having
      a dump valve (8;8';28;38) having a sleeve (10;10') and a slide (12;12';32) disposed within the sleeve, the sleeve having a first opening (11,11') and the slide having a second opening, the slide (12;12';32) being movable between a first position exposing the first opening (11;11') and permitting pressure medium from the cylinder/piston unit (1) to flow to a sump and a second position aligning the first opening (11;11') and the second opening and permitting pressure medium from the reversible electric motor/pump to flow to the cylinder/piston unit, the slide being spring biased in to the first position to permit the flow of pressure medium from the cylinder/piston unit to the sump when the reversible electric motor/pump unit is deactivated, the slide being positionable in the second position in response to positive pressure of the pressure medium from the reversible electric motor/pump unit and positionable in the first position in response to negative pressure of the pressure medium from the reversible electric motor/pump unit; and
      a nonreturn valve (9;29) disposed within the slide and fluidly coupling the cylinder/piston unit and the reversible electric motor/pump unit, the nonreturn valve being movable between a closed position and an opened position, the nonreturn valve being biased in the closed position, the nonreturn valve permitting flow of pressure medium therethrough only from the reversible electric motor/pump unit (3) to the cylinder/piston unit (1) via the first opening and the second opening in the opened position.

6. The actuator as claimed in claim 5, further comprising:
   a controller (21) controlling the electric motor/pump unit (3), the controller receiving a set point value signal corresponding to a desired pressure within the cylinder/piston unit and an actual value signal corresponding to an actual pressure within the cylinder/piston unit.

7. The actuator as claimed in claim 5, wherein the dump valve is biased such that the dump valve moves from the first position to the second position before the nonreturn valve moves from the closed position to the opened position.

8. A friction clutch in the drive train of a motor vehicle, the friction clutch comprising:
   a clutch plate; and
   an actuator having:
      a cylinder/piston unit generating a contact pressure against the clutch plate;
      a reversible electric motor/pump unit (3) selectively providing a pressure medium; and a self-regulating valve unit (2) coupling the cylinder/piston unit and the reversible electric motor/pump unit such that the friction clutch is controlled by actuating the motor/pump unit (3), the self-regulating valve unit (2) having
 a dump valve (8;8';28;38) having a sleeve (10;10') and a spring-assisted slide (12;12';32) disposed within the sleeve, the dump valve further having a first opening (11,11'), through which pressure medium from the cylinder/piston unit (1) can flow to a sump, the spring-assisted slide (12;12';32) being movable between a first position, in which it exposes the opening (11;11'), and a second position, in which it conceals the opening (11;11'), the spring-assisted slide being spring biased in to the first position to permit the flow of pressure medium from the cylinder/piston unit to the sump when the reversible electric motor/pump unit is deactivated, the spring-assisted slide being positionable in the second position in response to positive pressure of the pressure medium from the reversible electric motor/pump unit and positionable in the first position in response to negative pressure of the pressure medium from the reversible electric motor/pump unit; and
 a nonreturn valve (9;29) disposed between the reversible electric motor/pump unit (3) and cylinder/piston unit (1), the nonreturn valve permitting a fluid flow to take place only in the direction from the reversible electric motor/pump unit (3) to the cylinder/piston unit (1).

* * * * *